May 15, 1934.　　　J. U. LEHN ET AL　　　1,958,856
ANIMAL TRAP
Filed May 20, 1933
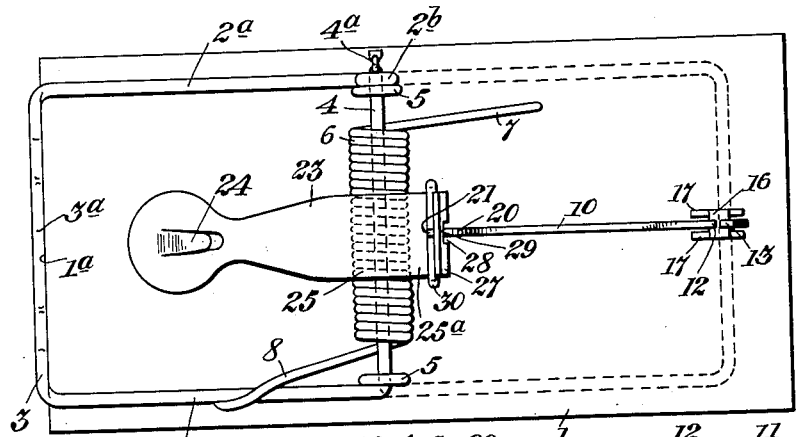
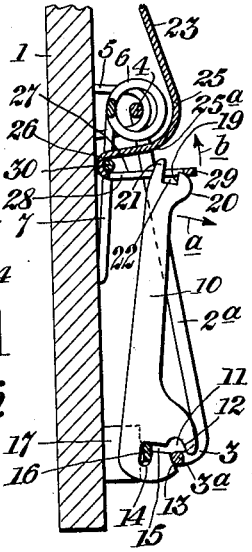
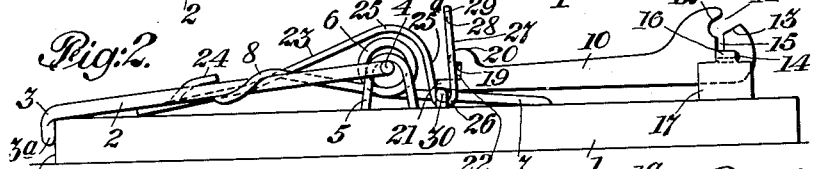
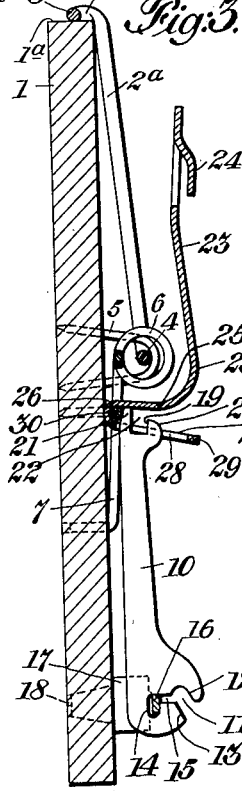
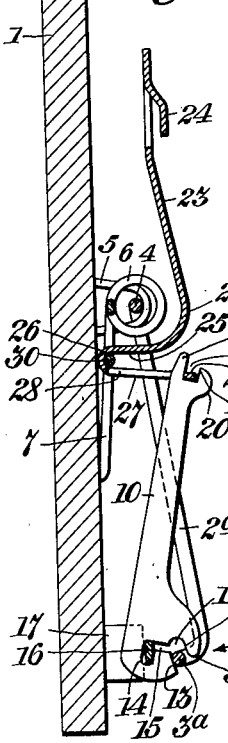
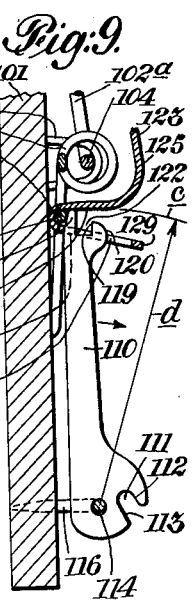
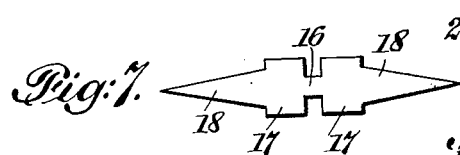
INVENTORS
John Lehn and
Herman Drach
BY
Louis Russell Whitaker
ATTORNEY Patented May 15, 1934

1,958,856

UNITED STATES PATENT OFFICE 1,958,856

ANIMAL TRAP

John U. Lehn and Herman Drach, Lititz, Pa., assignors to Animal Trap Company of America, Lititz, Pa., a corporation of Pennsylvania Application May 20, 1933, Serial No. 671,952

3 Claims. (Cl. 43—83)

Our invention consists in the novel features hereinafter described, reference being had to the accompanying drawing which illustrates one embodiment of the same, and a slight modification thereof, selected by us for purposes of illustration, and the said invention is fully disclosed in the following description and claims.

The object of our invention is to provide a very cheap and efficient trap intended primarily for mice, rats and other small animals which may be set automatically when held in a position vertically, by simply swinging the striker or jaw from the released to the set position.

In the accompanying drawing,

Fig. 1 represents a top plan view of the trap embodying our invention, showing the parts in the released position, the set position of the striker or jaw being indicated in dotted lines.

Fig. 2 is a side elevation of the trap in the released position.

Fig. 3 is a vertical sectional view of the trap supported in vertical position for setting.

Fig. 4 is a partial sectional view, similar to Fig. 3, showing an intermediate position of the locking bar when the jaw is moved into position to set the trap.

Fig. 5 is a view similar to Fig. 3, showing the position of the parts when the jaw is moved into position to effect the automatic setting of the trap.

Fig. 6 is a view similar to Figs. 3 and 5 showing the position of the parts after the trap is set and the hand is removed from the jaw.

Fig. 7 is a detail plan view of a blank forming the pivotal support for the locking bar illustrated in the foregoing figures.

Fig. 8 is a detail perspective view showing the coacting portions of the trigger arm and locking bar in the set position shown in Fig. 6, parts of the locking bar and trigger arm being broken away.

Fig. 9 is a partial sectional view of a trap with the parts substantially in the position shown in Fig. 3 and illustrating a slight modification.

Referring to Figs. 1 to 8 inclusive, 1 represents the base of the trap, which is preferably made of wood, although it might be made of other material. The striker or jaw is preferably made in one piece, with its pivot shaft, and comprises the side arms, 2 and 2a, cross bar, 3, and the pivot shaft, 4, which as shown is integral with the arm, 2, and extends through an eye, 2b, at the inner end of the arm, 2a, and is provided with an enlargement, 4a, which may be in the form of an upset portion, or other enlargement. The cross-bar, 3, of the jaw or striker, preferably lies just beyond the end, 1a, of the base, and is provided with a downwardly offset central portion, 3a, as indicated in Figs. 1 and 2, which extend slightly below the upper face of the base when the parts are in the released position shown in Fig. 1. The jaw or striker is pivotally connected with the base 1, in any preferred manner, as for example, by staples, 5—5. The jaw is also provided with a suitable spring, and we prefer to employ a spring having a single helical coil, indicated at 6, which is slipped over the pivot shaft, 4, before the end, 4a, thereof is passed through the eye, 2b, and secured by swaging or otherwise. One end of the coil, 6, is provided with an arm, 7, engaging and preferably secured to the base, 1, the other end of the spring being provided with an arm, 8, which engages the jaw structure, in this instance having an engagement with the arm, 2, thereof, and normally holding the jaw in the position indicated in Figs. 1, 2 and 3.

10 represents a locking bar, which is pivoted adjacent to the rear end of the block or base, 1, and is provided with a notch, indicated at 11, the upper edge, 12, forming a detent to be engaged by the crossbar, 3, in the set position of the trap, to hold it in set position. The opposite edge, 13, of the notch, 11, extends rearwardly slightly beyond the outer end of the detent, 12, and provides a face which is engaged by the crossbar, 3, when it is swung over into setting position, thereby rocking the locking bar on its pivotal support, as hereinafter more fully described.

In the present instance we have shown the locking bar, 10, provided with a longitudinally elongated pivotal aperture, 14, which is connected by a slot, 15, with the inner end of the notch, 11, and where this arrangement is employed, we use a staple of the kind illustrated in Fig. 7, which may be conveniently stamped out of sheet metal and bent into the desired form. This staple comprises the pivotal portion, 16, connecting two side plates, 17, 17, each of which is provided with a point or tang, 18, adapted to be driven into the base, 1, and clinched or otherwise secured thereto.

The forward end of the locking bar is provided with a trigger engaging portion, 19, having a rounded or beveled outer face or cam portion, indicated at 20, and a longitudinally disposed stop projection, 21, separated from the trigger by a notch 22, and extending longitudinally and forwardly beyond the end of the trigger.

The forward end of the locking bar, 10, cooperates with a bait pedal, 23, having a bait holding portion, 24, extending toward the forward edge, 1a, of the trap and having a portion, 25, extending around and over the spring, 6, and downwardly to the upper face of the base, 1, forming a non-perforated stop engaging portion, 25a. At the lower end of the portion, 25a, the bait pedal is curved sharply back upon itself to form a pivotal portion, 26, and an upwardly extending trigger arm, 27, provided with a vertical slot, 28, said arm terminating above said slot in a transversely disposed trigger portion, 29. The bait pedal is pivotally connected with the base, 1, in rear of the spring, 6, preferably by means of a staple, 30, engaging the pivotal portion, 26.

In assembling the parts, the locking bar is pivotally connected with the base before the connection of the bait pedal therewith or vice versa, in order to permit the proper engagement of the parts, and in the construction illustrated in Figs. 1 to 8, the staple illustrated in Fig. 7 has its pivotal portion, 16, inserted in the pivotal aperture, 14, of the locking bar, by passing it through the notch, 11, and connecting slot, 15, before the staple is driven into the base. For purposes of illustration we may assume that the staple has been engaged with the locking bar driven into the base to pivotally support the locking bar, and that thereafter the bait pedal is placed in engagement with the forward end of the locking bar, in the manner illustrated in the drawing, and pivotally connected to the base by driving in the staple, 30. The relation of these parts is such that in the released position of the trap, illustrated in Figs. 1 and 2, the stop projection, 21, of the locking bar, extends through the slot, 28, in the trigger arm, 27, into proximity to the stop engaging portion, 25a, of the bait pedal, forward of its pivotal support and the position of the trigger arm of the bait pedal is such that if the locking bar, 10, is swung upwardly on its pivotal connection, it will strike the trigger, 29, at the upper end of the slot and cannot be disengaged from the slot, so that there is no possibility of the locking bar and bait pedal getting out of operative engagement after the parts are assembled.

To set the trap it is necessary to place it in a vertical position, as indicated in Fig. 3, with the crossbar, 3, of the jaw uppermost. In this position the bait carrying portion, 24, of the bait pedal, 23, will swing upwardly away from the base a short distance until the stop engaging portion, 25a, engages the stop projection, 21, of the locking bar, 10, which prevents the bait pedal from swinging further and holds the trigger in proper position to engage the cam face of the locking bar. The spring actuated jaw is then swung on its pivotal connections against the action of the spring, 6, through an arc of substantially 180° until the central portion, 3a, of crossbar, 3, comes in contact with the edge, 13, of the locking bar, as shown in Fig. 4. This causes the locking bar to swing in a direction away from the base, as indicated by the arrow, a, in Fig. 4, until the cam portion, 20, of the trigger engaging portion, 19, comes in contact with the trigger, 29 as at the outer end of the slot, 27. When this occurs the trigger arm will be raised as indicated by the arrow, b, in Fig. 4, and the further movement of the locking bar will cause the trigger, 29, to drop into the notch or recess, 22, between the trigger engaging portion, 19, and cam 20, and the stop projection, 21, as clearly shown in Fig. 5. This outward movement of the locking bar away from the base, will bring the detent, 12, of the locking bar into position to engage the portion, 3a, of the crossbar, 3, when the jaw is released by the operator.

The operator thereupon releases the spring jaw slightly, permitting the portion, 3a, of the crossbar to engage the detent, 12, as shown in Fig. 6, and the outward thrust of the part, 3a, on said detent will cause the trigger engaging portion, 19, of the locking bar to bear with considerable friction on the outer face of the trigger, 29. The notch or recess, 22, is made of just sufficient depth to allow proper engagement between the parts, 19, and 29. The trap is now set and may be placed in a horizontal position, wherever desired. The frictional engagement between the part, 19, of the locking bar and the trigger, 29, is sufficient to prevent any possibility of the trap being sprung unintentionally. The trap, however, is very sensitive as the bait pedal is not counterbalanced, and as the locking bar is placed edgewise with respect to the base, the area of the thin edge of the trigger engaging portion, 19, which is in engagement with the trigger, 29, in the set position of the trap is very small consequently the slightest downward pressure on the bait carrying portion of the pedal will readily overcome the frictional resistance between the part, 19, and the trigger, 29, and cause the trigger to move forward far enough to disengage the part, 19. This permits the forward end of the locking bar to drop toward the base, releasing the jaw which returns instantly to the released position, striking the animal which has depressed the bait pedal. It will be noted that one reason for the extreme sensitiveness of the trap is that the animal nibbling at the bait does not have to overcome the action of a spring or counterbalance weight, and as a matter of fact, the weight of the forwardly extending portion of the bait pedal and of the bait itself acts in a direction to disengage the trigger, so that a slight pressure on the bait or bait pedal is sufficient to release the jaw.

In some instances we find it desirable to form the stop engaging part, 25a, of the bait pedal forward of its pivotal support with an offset upper portion, as indicated at 25ax, in Fig. 8. The wire used in stapling the bait pedal to the block or base is ordinarily quite small in diameter, even in the rat trap, and is of course still smaller in diameter in the mouse trap. This shoulder facilitates the provision of sufficient space between the parts, 25ax and 27, so that there is no danger of the stop projection, 21, slipping out of the slot, 28, when the bait pedal is in released position, and at the same time no undue play is permitted to the bait pedal, as the part of the bait pedal below the offset portion, which engages the staple can be made sufficiently narrow to provide a good pivotal connection therewith. The provision of this offset portion enables the trap to be manufactured without working to such close dimensions as would otherwise be necessary, and slight variations in the formation of the parts or in the assembly which are likely to occur in quantity production of a cheap article of this kind will not interfere with the correct and accurate functioning of the trap.

In Fig. 9 we have shown a partial view of a trap embodying a slight modification of our invention, and the parts there shown which correspond with those previously described, have been given the same reference numerals with the addition of 100. In this figure, the locking bar, 110, is provided with a pivotal aperture, 114, which is not connected with the notch, 111, said pivotal aperture engaging pivotally a staple, indicated at 116, formed simply of round wire in the usual manner. In this figure, also, the vertically disposed portion, 125a, of the bait pedal, 123, is curved coaxially with the pivotal axis of the locking bar, as indicated by the line, c, and arrow, d, in Fig. 9, so that when the trap is being set, and is in the vertical position indicated, the stop projection, 121, on the locking bar will engage this coaxial portion, 125, and the locking bar can be swung outwardly in setting the trap, without affecting the position of the bait pedal until the cam portion, 120, engages the trigger, 129. This facilitates the quick and easy setting of the trap.

What we claim and desire to secure by Letters Patent is:

1. In a trap, the combination with a base and a spring actuated jaw pivotally connected thereto, of a locking bar having adjacent to its rear end a pivotal support, a jaw engaging detent, and a jaw engaging part between said detent and the base extending rearwardly of the detent, said locking bar having its forward end disposed edgewise with respect to the base and provided with a recess, a trigger engaging portion above said recess, and a projection below said recess extending forwardly beyond the trigger engaging portion, and a pivoted bait pedal having a vertically disposed portion in rear of its pivot provided with a slot to engage said projection of the locking bar, and a trigger at the outer end of said slot, said locking bar being provided above the trigger engaging portion with a cam face for engaging the trigger and rocking the bait pedal to permit of the engagement of the trigger and said trigger engaging portion of the locking bar when the trap is set.

2. In a trap, the combination with a base and a spring actuated jaw pivotally connected thereto, of a locking bar having adjacent to its rear end a pivotal support, a jaw engaging detent, and a jaw engaging part between said detent and the base extending rearwardly of the detent, said locking bar having its forward end disposed edgewise with respect to the base and provided with a recess, a trigger engaging portion above said recess, and a stop projection below said recess extending forwardly beyond the trigger engaging portion, and a pivoted bait pedal having a vertically disposed portion in rear of its pivot provided with a slot to engage said projection of the locking bar, and a trigger at the outer end of said slot, said locking bar being provided above the trigger engaging portion with a cam face for engaging the trigger and rocking the bait pedal to permit of the engagement of the trigger and said trigger engaging portion of the locking bar when the trap is set, said bait pedal having an unperforated stop engaging portion forward of its pivot, for engaging said forwardly extending projection of the locking bar and holding the trigger in proper position to engage said cam face of the locking bar in setting the trap, said bait pedal having unsupported portions extending forwardly of its pivot and tending to move by gravity in a direction to release the locking bar when the trap is in set position.

3. In a trap, the combination with a base and a spring actuated jaw pivotally connected thereto, of a locking bar having adjacent to its rear end a pivotal support, a jaw engaging detent, and a jaw engaging part between said detent and the base extending rearwardly of the detent, said locking bar having its forward end disposed edgewise with respect to the base and provided with a recess, a trigger engaging portion above said recess, and a stop projection below said recess extending forwardly beyond the trigger engaging portion, and a pivotal bait pedal having a vertically disposed portion in rear of its pivot provided with a slot to engage said projection of the locking bar, and a trigger at the outer end of said slot, said locking bar being provided above the trigger engaging portion with a cam face for engaging the trigger and rocking the bait pedal to permit of the engagement of the trigger and said trigger engaging portion of the locking bar when the trap is set, said bait pedal having an unperforated stop engaging portion forward of its pivot curved substantially coaxially with the pivotal axis of the locking bar, for engaging said forwardly extending projection of the locking bar and holding the trigger in proper position to engage said cam face of the locking bar in setting the trap, said bait pedal having unsupported portions extending forwardly of its pivot and tending to move by gravity in a direction to release the locking bar when the trap is in set position.

JOHN U. LEHN.
HERMAN DRACH.